United States Patent [19]

Boyer et al.

[11] 4,229,029
[45] Oct. 21, 1980

[54] HOSE COUPLING

[76] Inventors: Jean-Jacques, deceased Boyer, late of Montchauvet; Pascal by Boyer, heir, Rue Freneaux, Montchauvet, Yvelines, France

[21] Appl. No.: 925,205

[22] Filed: Jul. 17, 1978

[30] Foreign Application Priority Data

Jul. 18, 1977 [FR] France ............................... 77 21904

[51] Int. Cl.$^2$ .............................................. F16L 33/22
[52] U.S. Cl. .................................... 285/242; 285/323
[58] Field of Search ............... 285/255, 149, 242, 243, 285/322, 104, 105, 102, 323; 403/369

[56] References Cited

U.S. PATENT DOCUMENTS

| 2,880,020 | 3/1959 | Audette | 285/255 |
| 2,940,778 | 6/1960 | Kaiser | 285/255 X |
| 3,222,091 | 12/1965 | Marshall | 285/255 X |
| 3,226,137 | 12/1965 | Trnka | 285/255 X |

FOREIGN PATENT DOCUMENTS

| 2456678 | 8/1976 | Fed. Rep. of Germany | 285/248 |
| 1227327 | 3/1960 | France | 285/149 |
| 850131 | 9/1960 | United Kingdom | 285/149 |
| 904948 | 9/1962 | United Kingdom | 285/149 |

*Primary Examiner*—Thomas F. Callaghan
*Attorney, Agent, or Firm*—Darby & Darby

[57] ABSTRACT

A hose coupling having a fixation collar with a tapered inner surface to be joined with a clamp for the coupling in which several jaws in the shape of tapered sectors are engaged in the collar while leaving a clearance between two successive jaws which form a substantially cylindrical surface surrounding the outer surface of the hose to be connected. A cylindrical sleeve is engageable inside the hose and is formed with a flange for bearing against the end face of the jaws and a tip portion which is slidable in a coaxial bore of the clamp, the diameter of said bore being greater to the inner diameter of the hose, so that a differential pressure area is established which applies pressure to the tip of the sleeve to drive it in a direction such that the flange engages the jaws.

3 Claims, 2 Drawing Figures

HOSE COUPLING

The present invention relates to hose couplings and more particularly to coupling for reinforced hose which are subjected to high pressures of the order of a few hundreds of bars, such as hoses used in the high pressure hydraulic transmissions or similar.

According to the conventional technique, the hose coupling is provided by crimping the ends of said hoses on clamps which are in turn fixed by screws or similar fasteners onto spout-holes of hydraulic pumps, motors and tanks, or others. Said coupling process offers some disadvantages. It necessitates lenghty and delicate operations for preparing the hoses. The plastics part of the hose is subjected to high mechanical stresses which have to prevent any flow in use at the maximum pressures but which nevertheless must not damage the plastics layer. Moreover when, following an overpressure, the hose collapses, the hose clamp assembly has to be replaced since the clamps and couplings cannot be used again.

The object of the present invention is to remedy the hereabove mentioned disadvantages by providing a coupling for reinforced hoses which is removably mounted on the end of the reinforced hose after a very simple preparation of said end, which is easily mounted and dismantled, which provides a very good tightness and which, moreover, can be used again, thereby facilitating the replacement of said hoses in particular when they have collapsed due to an over pressure.

Couplings have already been proposed, particulary in U.S. Pat. No. 3,222,091, which attempt to remedy these disadvantages and comprise a first coupling part in the shape of a collar with tapered inner surface, several jaws in the shape of tapered sectors engageable in the collar between the inner surface of the latter and the outer surface of the hose to be connected, and a piece forming an inner sleeve engaged into the hose to be connected, said piece being slidably mounted in a tight manner in a second coupling part so as to be pushed by the fluid pressure towards the inside of the hose. This coupling corresponds theoretically to the objects of the invention. However, in the coupling of the patent, after the first tightening operation of the jaws provided by a thrust resulting from the positioning of the second coupling part, the subsequent displacement of the sleeve under the effect of the operational pressure transmits a force in the direction tending to extract the hose from the coupling on the inner face of said hose, and according to said patent, it is this force which is transmitted through the thickness of the hose which will drive the jaws still further in order to increase the clamping of the hose. The end portion of the hose will therefore be subjected to an extremely high longitudinal stress which will favour the unsticking of the constituent layers and which is liable to make the hose slide on the surface of the jaws or of the inner sleeve particularly in the case of reinforced hose, the reinforcement layer of which, made of metallic wires, has to be in contact with the jaws for avoiding blocking of the latter by the flow of the superfical elastomeric layer.

The coupling according to U.S. Pat. No. 3,222,091 has therefore the disadvantage of creating a longitudinal stress creating a shearing force in the thickness of the hose between the inner surface and the outer surface of the end mounted in the coupling. Moreover, and due to the flow of the elastomeric material forming the hose which is not limited by an enveloping volume, it can well happen that the sleeve is thrust back inside the hose.

While relating to a coupling of such a type, the invention remedies such disadvantages.

The coupling for hoses according to the present invention includes a first coupling part made of a fixation collar with tapered inner surface, capable of being made rigid with an assembly clamp of the coupling, several jaws in the shape of tapered sectors engageable in the collar with their outer surface in contact with the inner face of the collar while preserving a clearance between two successive jaws, their inner surface which is substantially cylindrical enclosing the outer surface of the hose to be connected and a sleeve engageable inside the hose to be connected and comprising a tip portion slidable in a tight manner inside a co-axial bore of the coupling having a diameter greater than the inner diameter of the hose so as to form a differntial piston, a cylindrical sleeve forming a differential piston is formed with a flange coming to bear against the end face of the jaws.

With this embodiment, the operational pressure which is applied on the differential surface between the diameter of the clamp bore and the inner diameter of the hose thrusts back the cylindrical sleeve, but the latter, by means of its flange, pushes the jaws inside the tapered collar, said jaws forming wedges for pressing the end of the hose against the outer surface of the cylindrical sleeve. It should be noted that no relative longitudinal displacement can occur between the jaws bearing on the outer surface of the hose and the sleeve bearing on the inner surface of the latter, and that no tear or shear is to be feared in the thickness of the hose. Moreover, the free end of the pipe to be connected is enclosed between the jaws at the outside, the sleeve at the inside and the flange at the periphery of the sleeve which comes to bear against the end of said jaws, thus preventing any flow of the hose elastomeric material.

The opposite surfaces of the jaws made in the shape of tapered sectors and of the cylindrical sleeve may be provided with peripheral grooves and corresponding ribs in coincidence for improving clamping and tightness.

According to a further characteristic of the present invention, the fixation collar is joined with the clamp through a counter clamp engaging from above the peripheral flange of the collar and joined with the clamp by means of clamping screws. The collar and sleeve being of revolution are free to rotate inside the clamps during mounting, which prevents any twist in the hose. Moreover, the coupling can be completely taken apart and reused, in case of the hose bursting.

According to a characteristic of the present invention, the portion in contact with the jaws of the end of the hose engaged inside the collar is stripped so that the jaws bear directly on the reinforcement sleeve in order to avoid that the elastomeric material layer flows between the jaws and prevent clamping.

Further characteristics and advantages of the present invention will become more apparent from the following description of a preferential embodiment of a coupling for a hose, made with reference to the accompanying drawing wherein.

Figure 1:
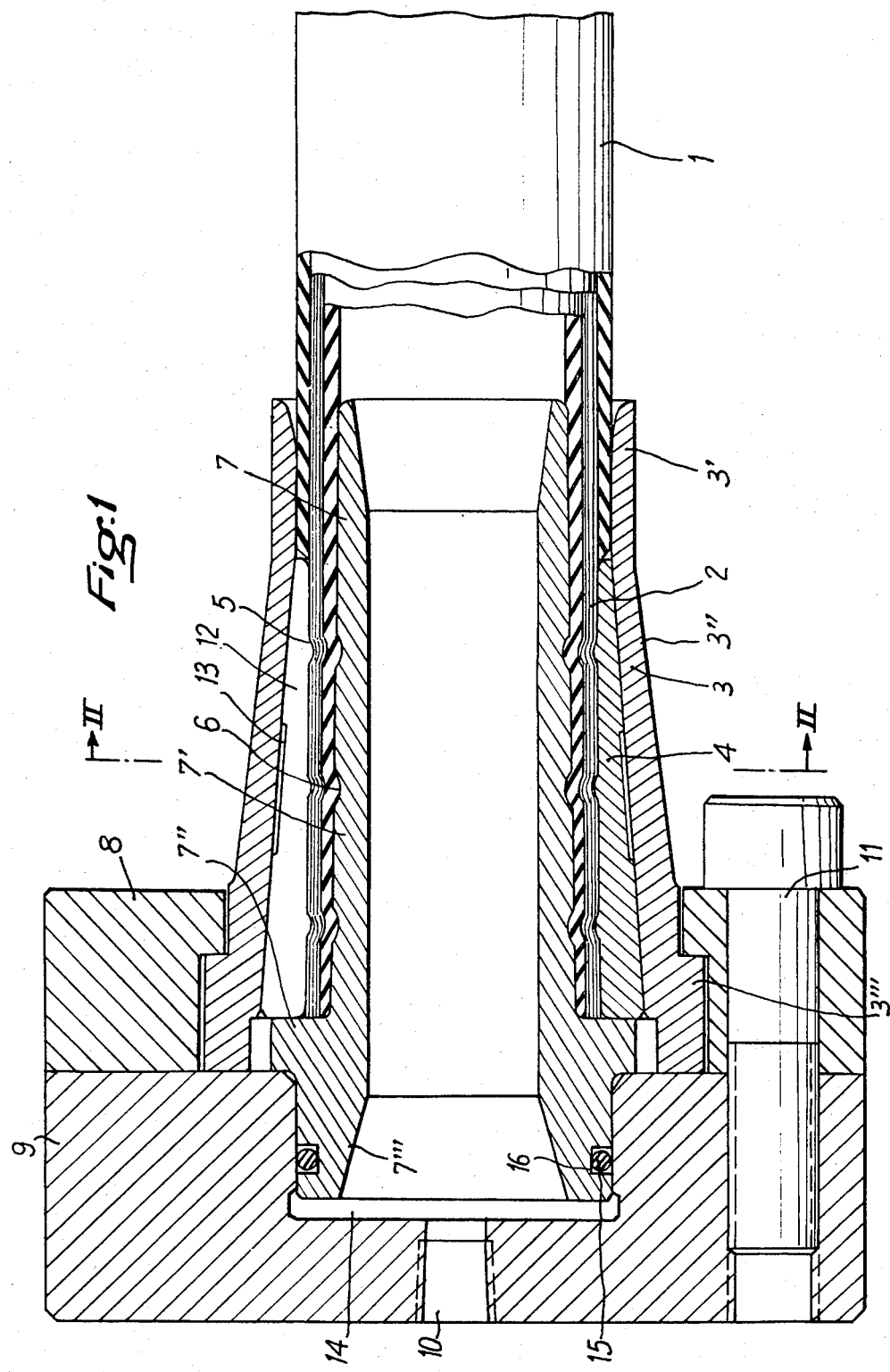
FIG. 1 is an axial cross-section of the coupling.
Figure 2:
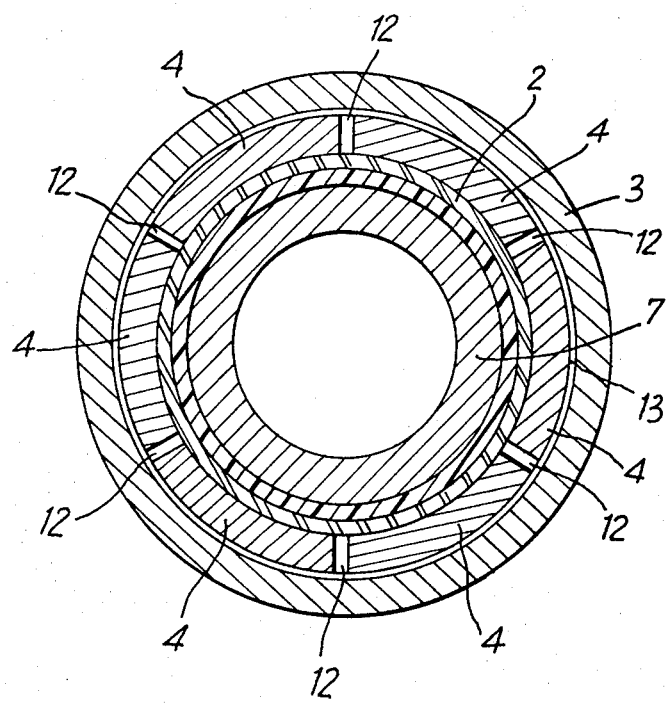
FIG. 2 is a cross-sectional view along line II—II of FIG. 1.

The coupling shown is provided, for instance, for the junction of a reinforced hose 1 with one of the spout-holes of a high pressure hydraulic transmission unit or similar. The coupling according to the present invention comprises a fixation collar 3 joined through a counter clamp 8 with a clamp 9 and being inserted on the end of the reinforced hose 1. A plurality of jaws 4, shown as six in FIG. 2, in the shape of tapered sectors are engageable inside the collar 3 and a cylindrical sleeve 7 is engageable inside the end of the reinforced hose 1 to be connected and coming in abutment against the end face of the jaws 4. The fixation collar 3 is made of a cylindrical portion 3' of inner diameter substantially equal to the outer diameter of the reinforced hose 1, said cylindrical portion 3' being continued by a tapered portion 3" which ends in turn by a peripheral flange 3'". Moreover, said collar 3 is joined with clamp 9 through a counter clamp 8 engaged from above with the peripheral flange 3'" of collar 3, the clamp 9 and the counter clamp 8 being joined through screws 11. As can be seen clearly from the figures, the six jaws 4 in the shape of tapered sectors are engaged in the collar 3 with their outer surface in contact with the inner tapered surface 3" of the collar 3 while leaving a clearance 12 between two successive jaws 4. The inner surface of the jaws surrounds the portion 2 of the hose which has been stripped by removing the plastics material portion which is at the outside of the braided sleeving, in order to avoid any risk of flow of the plastics material during clamping. On the other hand, in order to facilitate engagement of jaws 4 inside collar 3, while avoiding a too high frictional force, the outer surface of jaws 4 is formed on its periphery with a shallow groove 13, thereby reducing the bearing surface of the jaws at their end portions. The tubular sleeve 7 engageable inside hose 1 is formed with a flange 7" which comes in engagement with the end face of jaws 4 and a front tip portion slidable in a tight manner in a co-axial bore 14 formed in the clamp 9, the diameter of said bore being greater than the inner diameter of the reinforced hose 1, that is the outer diameter of the cylindrical portion of the sleeve engaged inside the hose. Moreover, in order to provide tightness between the tip portion and the bore 14, an O ring 15 is inserted in a peripheral groove 16 formed on the outer surface of the tip portion. On the other hand, in order to improve the clamping and the tightness, the opposite surfaces of the cylindrical sleeve 7 and of the jaws 4 in the shape of tapered sectors are respectively provided with peripheral grooves 5 and with coinciding corresponding ribs 6.

Moreover, in order to provide passage for the fluid between the spout-hole of the hydraulic transmission or similar and the hose, the clamp 9 is formed with a co-axial opening 10.

Thus, with this embodiment, the pressure exerted on the differential surface between the diameter of the bore 14 of clamp 9 and the inner diameter of the hose 1 thrusts back the cylindrical sleeve 7 which, through its flange 7", pushes the jaws 4 in engagement inside the tapered collar 3, said jaws 4 forming wedges for clamping the end of the hose 1 against the outer surface of the cylindrical sleeve 7.

The hereabove described embodiment may receive many modifications without departing from the scope of the accompanying claims.

What is claimed is:

1. A coupling for reinforced hose with reinforcement metallic sleeve comprising a fixation collar formed with a tapered inner surface, an assembly clamp to which the fixation collar is to be attached, a plurality of jaws in the shape of tapered sectors engageable in and spaced around the collar with the outer surfaces of the jaws in contact with the inner face of the fixation collar while leaving a clearance between two successive jaws, the inner surfaces of said jaws forming a substantially cylindrical surface for surrounding the outer surface of the hose to be connected, and a cylindrical sleeve having a portion engageable inside the hose to be connected and formed with a tip portion, the assembly clamp having a coaxial bore in which said tip portion of said cylindrical sleeve slides and which forms a pressure chamber so as to form with said tip a differential piston, the cylindrical sleeve having a flange which comes to bear against the end face of the jaws in response to a differential pressure to drive the sleeve toward the jaws so that the flange of the sleeve drives the tapered sectors further into the fixation collar to increase the grip on the hose between the fixation collar and the cylindrical sleeve.

2. A coupling for reinforced hose according to claim 1, wherein the fixation collar is joined with the assembly clamp by a counter clamp which is engaged over a peripheral flange of the collar and joined with the assembly clamp by means of clamping screws.

3. A coupling as in claims 1 or 2 wherein the end of the hose engaged in the collar is stripped to remove the elastomeric coating layer on the reinforcement metallic sleeve whereby the jaws directly contact the reinforcement metal sleeve.

* * * * *